United States Patent
Watanabe

(10) Patent No.: US 6,981,722 B2
(45) Date of Patent: Jan. 3, 2006

(54) PIPE COUPLING DEVICE

(75) Inventor: Toshikazu Watanabe, Nagoya (JP)

(73) Assignee: Denso Corporation, (JP)

( * ) Notice: Subject to any disclaimer, the term of this patent is extended or adjusted under 35 U.S.C. 154(b) by 89 days.

(21) Appl. No.: 10/865,921

(22) Filed: Jun. 14, 2004

(65) Prior Publication Data

US 2004/0262921 A1 Dec. 30, 2004

(30) Foreign Application Priority Data

Jun. 27, 2003 (JP) .............................. 2003-185932
Mar. 31, 2004 (JP) .............................. 2004-107792

(51) Int. Cl.
*F16L 35/00* (2006.01)
*F02M 55/02* (2006.01)

(52) U.S. Cl. ................... 285/353; 285/197; 285/334.5; 285/382; 123/456

(58) Field of Classification Search ............. 285/334.5, 285/354, 353, 197, 382, 382.7; 123/468, 123/456

See application file for complete search history.

(56) References Cited

U.S. PATENT DOCUMENTS

| | | | | |
|---|---|---|---|---|
| 1,989,674 A | * | 2/1935 | Boas et al. .................. 285/353 |
| 2,788,992 A | * | 4/1957 | De Vienne et al. ...... 285/136.1 |
| 3,703,184 A | | 11/1972 | Messerschmidt |
| 4,919,461 A | * | 4/1990 | Reynolds .................... 285/330 |
| 5,143,410 A | * | 9/1992 | Takikawa .................... 285/197 |
| 5,261,705 A | * | 11/1993 | Takahashi et al. .......... 285/197 |
| 5,667,255 A | * | 9/1997 | Kato ....................... 285/133.4 |
| 5,957,507 A | * | 9/1999 | Asada ........................ 285/189 |
| 5,979,945 A | * | 11/1999 | Hitachi et al. ........... 285/125.1 |
| 6,045,162 A | * | 4/2000 | Haibara ...................... 285/55 |
| 6,415,768 B1 | * | 7/2002 | Usui .......................... 123/468 |
| 6,463,909 B2 | * | 10/2002 | Asada et al. ............. 285/133.4 |
| 6,736,431 B2 | * | 5/2004 | Jung et al. ............... 285/288.1 |
| 2003/0042735 A1 | * | 3/2003 | Jung et al. ............. 285/133.11 |

FOREIGN PATENT DOCUMENTS

| | | |
|---|---|---|
| DE | 19956830 | 6/2001 |
| JP | 2001-082663 | 3/2001 |
| WO | WO 01/09506 A1 | 2/2001 |
| WO | WO 03/098030 A1 | 11/2003 |

* cited by examiner

Primary Examiner—Eric K. Nicholson
(74) Attorney, Agent, or Firm—Nixon & Vanderhye PC

(57) ABSTRACT

A pipe coupling device has a main body defining a main body passage hole to permit communication between inside the main body passage hole and outside the main body passage hole. A fixing screw member is joined to the main body to surround a periphery of the main body passage hole, the fixing screw member having an external thread formed in its outer peripheral surface. A sleeve is insertable in the fixing screw member while a tilt preventing gap is defined between the sleeve and an inner peripheral surface of the fixing screw member. A first convergently tapered portion formed at a tip end of the pipe is pressed against a first pressure bearing surface formed at one end of the sleeve to form a first seal. A second convergently tapered portion formed at the other end of the sleeve forms a second seal.

18 Claims, 8 Drawing Sheets

AMOUNT OF RADIAL DEFORMATION (mm)

PIPE COUPLING DEVICE

CROSS REFERENCE TO RELATED APPLICATIONS

This application is based upon, claims the benefit of priority of, and incorporates by reference Japanese Patent Application No. 2003-185932 filed Jun. 27, 2003, and No. 2004-107792 filed Mar. 31, 2004.

1. Field of the Invention

The present invention relates to a pipe connection technique for a high-pressure fluid such as for connecting a pipe with a common rail main body of an accumulator fuel injection device of an internal injection engine.

2. Background of the Invention

Conventionally known pipe coupling devices for connecting a pipe (e.g. high-pressure pump pipe and injector pipe) with a main body (e.g. common rail main body) include a device in which a sleeve is interposed between the main body and the pipe.

This type of pipe coupling device will be described with reference to FIG. 9. The pipe coupling device shown in FIG. 9 exhibits a fixing screw member J3 joined to a common rail main body J2 that surrounds the periphery of a main body passage hole J1 and a sleeve J4 inserted in the inside of the fixing screw member J3. A pipe fastening screw member J5 is engaged with the fixing screw member J3 so that a first convergently tapered portion J7 of a pipe J6 is pressed against a first pressure bearing surface J8 of the sleeve J4 to form a first seal portion J9. At the same time, a second convergently tapered portion J11 of the sleeve J4 is pressed against a second pressure bearing surface J12 of the main body passage hole J1 to form a second seal portion J13, and an intra-pipe passage J14 of the pipe J6 communicates with the main body passage hole J1 through a sleeve passage hole J15. See Japanese Patent Laid-Open Publication No. 2001-082663.

In the pipe coupling device constructed as described above, since the first pressure bearing surface J8 is tapered, the first pressure bearing surface J8 is forcibly extended in the outward radial direction by a clamping load applied to the first pressure bearing surface J8 by the first convergently tapered portion J7 of the pipe J6 when the pipe fastening screw member J5 is clamped. Accordingly, the sleeve J4 around the periphery of the first pressure bearing surface J8 is forcibly extended to the outer radial direction to enlarge the diameter thereof.

On the other hand, in the pipe coupling device constructed as described above, a radial gap (tilt preventing gap) is defined between the fixing screw member J3 and the sleeve J4 so as to be as small as about 0.05 mm, for example, for the purpose of preventing the sleeve J4 from tilting in the inside of the fixing screw member J3.

Therefore, if the external surface of the sleeve J4 in the outer circumference of the first pressure bearing surface J8 is forcibly extended in the radial direction by 0.05 mm or more, for example, the gap between the sleeve J4 and the fixing screw member J3 around the periphery of the first pressure bearing surface J8 will be eliminated. Consequently, the outer peripheral surface of the sleeve J4 around the periphery of the first pressure bearing surface J8 will come into pressurized contact with the inner peripheral surface of the fixing screw member J3.

When this happens, the axial load to be transmitted to the lower side (the common rail main body J2 side) of the sleeve J4 will be offset by the pressing force exerted in the radial direction between the sleeve J4 and the fixing screw member J3. As a result, the required load will not be transmitted to the lower side of the sleeve J4. This means that the load is not sufficient to press the second convergently tapered portion J11 of the sleeve J4 against the second pressure bearing surface J12 of the main body passage hole J1 and the second seal portion J13 cannot be securely formed. See Japanese Patent Laid-Open Publication No. 2001-082663.

SUMMARY OF THE INVENTION

The present invention has been made in view of the above circumstances, and therefore an object of the present invention is to provide a pipe coupling device in which even if a sleeve around the periphery of a first pressure bearing surface is forcibly extended in the outward radial direction by a clamping load applied from a pipe to the first pressure bearing surface, the device is capable of reliably transmitting the axial load received by the sleeve through the pipe to the main body side and capable of forming a reliable seal portion at both ends of the sleeve.

According to a first aspect of the pipe coupling device, a mouth deformation allowing gap is defined between a sleeve and a fixing screw member around the periphery of a first pressure bearing surface to allow for a diameter enlarging deformation of the sleeve, such that the mouth deformation allowing gap is larger than a tilt preventing gap.

By providing this mouth deformation allowing gap, the device is enabled to prevent the problem of the outer peripheral surface of the sleeve from being pressed against the inner peripheral surface of the fixing screw member around the periphery of the first pressure bearing surface. This is so even if the first pressure bearing surface is forcibly extended in the outward radial direction by the clamping load applied to the first pressure bearing surface from the pipe when a pipe fastening screw member is clamped and the sleeve around the periphery is enlarged in diameter.

As a result, the axial load received by the sleeve from the pipe can be reliably transmitted to the main body side, and a reliable seal can be formed at both ends of the sleeve (the pressurized contact portion between the pipe and the sleeve, and the pressurized contact portion between the sleeve and the main body).

According to a second aspect of the pipe coupling device, said sleeve is provided, between said sleeve and said fixing screw member around the periphery of said first pressure bearing surface, with a mouth deformation allowing gap. The gap allows the diameter enlarging deformation of the sleeve by reducing the outside diameter of the sleeve on the side connected with said pipe.

According to a third aspect of the pipe coupling device, the fixing screw member is provided, between the sleeve and the fixing screw member around the periphery of the first pressure bearing surface, with a mouth deformation allowing gap. The gap allows the diameter enlarging deformation of the sleeve by reducing the inside diameter of the fixing screw member on the side connected with the pipe.

The pipe coupling device according to a fourth aspect has a construction in which, when the sleeve is made of a steel material, the difference in the diameter due to a diameter enlarging deformation, $\Delta R$ ($\mu$m), that is, the amount of diameter enlarging deformation as measured in the radial direction of the sleeve around the periphery of the first pressure bearing surface, is determined by the following formula.

$$\Delta R = 0.00326 \times R_1^{0.51} \times R_2^{-3.79} \times R_3^{-0.66} \times R_4^{4.26} \times F$$

where an inside radius of the sleeve is denoted by R1 (mm), an outside radius of the sleeve is denoted by R2 (mm), a radius at the mouth of the first pressure bearing surface is denoted by R3 (mm), a pressing radius of the region of the first pressure bearing surface where the pipe is pressed against it is denoted by R4 (mm), and a clamping load of the pipe pressed against the first pressure bearing surface is denoted by F (N). The mouth deformation allowing gap is defined so as to be larger than the diameter difference due to the diameter enlarging deformation (amount of the diameter enlarging deformation) ΔR ($\mu$m) obtained by the formula above.

According to a fifth aspect of the pipe coupling device, the main body thereof is a common rail main body for storing high-pressure fuel in an accumulator fuel injection device. In other words, the pipe coupling device is used as a pipe connecting means of a common rail. In a sixth aspect of the pipe coupling device, the mouth deformation allowing gap is formed to be at least 0.1 mm in the radial direction.

When the pipe coupling device is used as a pipe connecting means of a common rail, the amount of diameter enlarging deformation as measured in the radial direction (diameter difference due to diameter enlarging deformation) of the sleeve around the periphery of the first pressure bearing surface is normally in the range of 0.09 mm or less. Therefore, when the mouth deformation allowing gap is formed to be at least 0.1 mm in the radial direction, even if the first pressure enlarging surface is forcibly extended in the outward radial direction by the clamping load applied to the first pressure bearing surface from the pipe and the diameter of the sleeve around the periphery thereof is enlarged thereby when the pipe fastening screw member is clamped, the amount of the diameter enlargement of the sleeve is allowed in the mouth deformation allowing gap. Hence, it is possible to prevent the problem that the outer peripheral surface of the sleeve is brought into pressurized contact with the inner peripheral surface of the fixing screw member around the periphery of the first pressure bearing surface.

In a seventh aspect of the pipe coupling device, a removed portion is provided around the entire outer circumference of the sleeve on the side connected with the pipe, or around the entire inner circumference of the fixing screw member on the side connected with the pipe. By forming this removed portion, a mouth deformation allowing gap for allowing the diameter enlarging deformation of the sleeve is defined between the sleeve and the fixing screw member. Thus, it is possible to prevent the problem of the outer peripheral surface of the sleeve from coming into pressurized contact with the inner peripheral surface of the fixing screw member. The pressurized contact is prevented around the periphery of the first pressure bearing surface, even if the first pressure bearing surface is forcibly extended in the outward radial direction and the diameter of the sleeve around the periphery thereof is enlarged by the clamping load applied to the first pressure bearing surface from the pipe when the pipe fastening screw member is clamped. As a result, the axial load received by the sleeve from the pipe can be reliably transmitted to the main body side, and a reliable seal can be formed at both ends of the sleeve (the pressurized contact portion between the pipe and the sleeve, and the pressurized contact portion between the sleeve and the main body).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
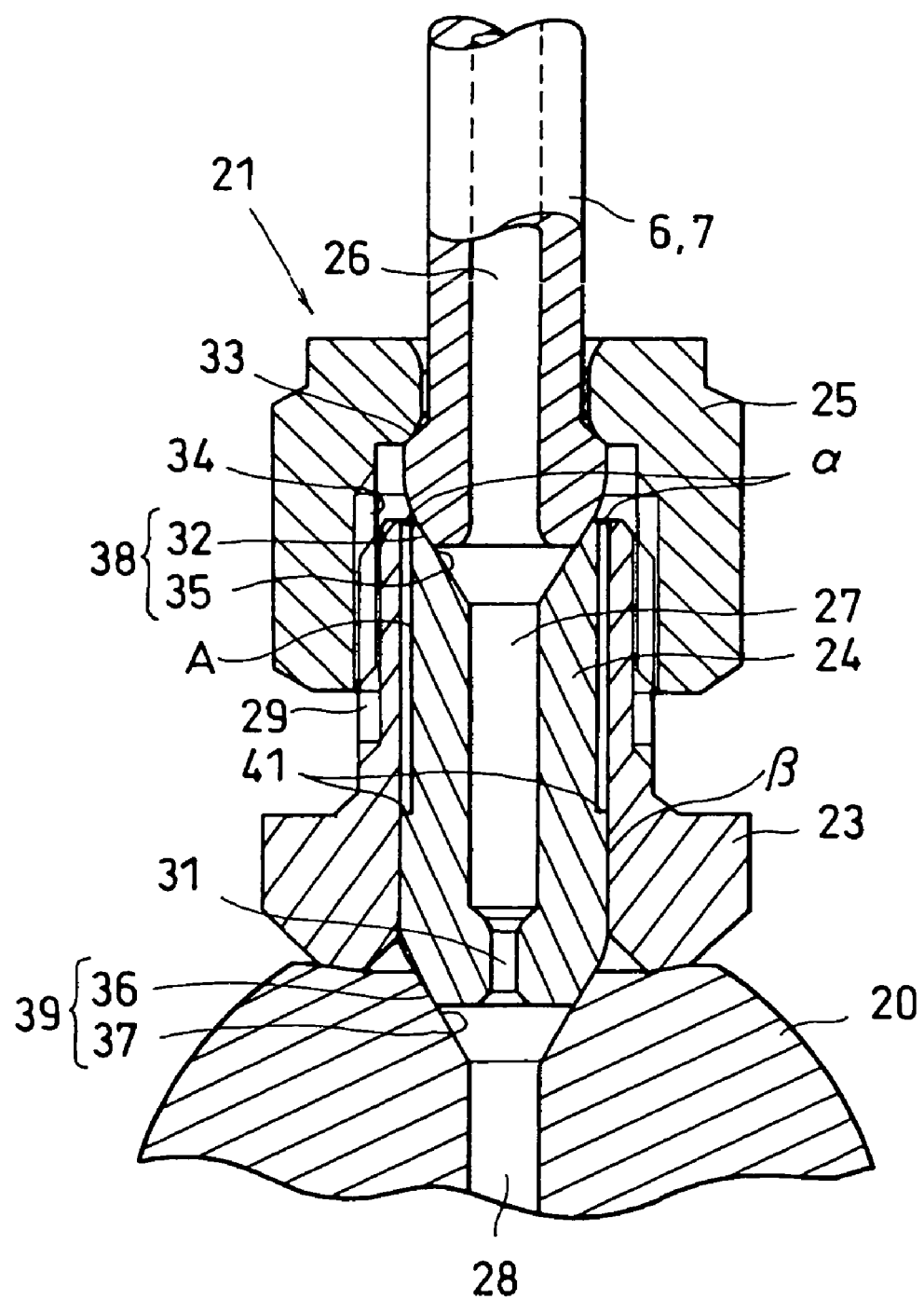
FIG. 1 is a cross-sectional view of a pipe coupling device according to a first embodiment.

The following description of the preferred embodiments is merely exemplary in nature and is in no way intended to limit the invention, its application, or uses.

In carrying out the embodiments of the invention, best modes have been recognized. A pipe coupling device according to a first best mode encompasses a main body having a main body passage hole permitting communication between the inside and the outside, and a fixing screw member joined to the main body in the state of surrounding the periphery of said main body passage hole, having an external thread formed in the outer peripheral surface thereof, and exhibiting a substantially cylindrical shape. Finally, a sleeve is insertable in the fixing screw member while defining a tilt or angle that prevents a gap between the sleeve and the inner peripheral surface of the fixing screw member so as to be prevented from tilting or angling in the inside of the fixing screw member.

Further, an internal thread, formed in the inner peripheral surface of a pipe fastening screw member that is rotatable in the state engaged with the pipe, is engaged with the external thread, whereby the intra-pipe passage of the pipe communicates with the main body passage hole through a sleeve passage hole formed at the center of said sleeve. At the same time, a first convergently tapered portion formed at the tip end of the pipe is pressed against a first pressure bearing surface formed at one end of the sleeve to form a first seal portion and a second convergently tapered portion formed at the other end of the sleeve is pressed against a second pressure bearing surface formed at the opening portion of said main body passage hole to form a second seal.

The pipe connecting device is provided, between the sleeve and the fixing screw member around the periphery of the first pressure bearing surface, with a mouth deformation allowing gap that is larger than the tilt preventing gap and permits the diameter enlarging deformation of the sleeve caused by a clamping load. By providing this mouth deformation allowing gap, it is possible to prevent the problem of the outer peripheral surface of the sleeve from coming into pressurized contact with the inner peripheral surface of the fixing screw member around the periphery of the first pressure bearing surface. This is possible even if the first pressure bearing surface is forcibly extended in the outward radial direction and the diameter of the sleeve around the periphery thereof is enlarged by the clamping load applied to the first pressure bearing surface from the pipe when the pipe fastening screw member is clamped. As a result, the axial load received by the sleeve from the pipe can be reliably transmitted to the main body side, and a reliable seal portion can be formed at both ends of the sleeve (the pressurized contact portion between the pipe and the sleeve, and the pressurized contact portion between the sleeve and the main body).

A pipe coupling device according to a second best mode has a main body having a main body passage hole that permits communication between the inside and the outside. A fixing screw member is joined to the main body by surrounding the periphery of the main body passage hole, and has an external thread formed in the outer peripheral surface thereof, and exhibits a substantially cylindrical shape, and has a sleeve inserted in the inside of the fixing screw member.

Further, an internal thread, formed in the inner peripheral surface of a pipe fastening screw member that is rotatable when engaged with the pipe, is engaged with the external thread, whereby the intra-pipe passage of the pipe is able to communicate with the main body passage hole through a sleeve passage hole formed at the center of said sleeve. At the same time, a first convergently tapered portion formed at the tip end of the pipe is pressed against a first pressure bearing surface formed at one end of the sleeve to form a first seal portion while a second convergently tapered portion formed at the other end of the sleeve is pressed against a second pressure bearing surface formed at the opening portion of said main body passage hole to form a second seal portion.

The pipe coupling device is provided with a removed portion around the entire outer circumference of the sleeve on the side connected with the pipe, or around the entire inner circumference of the fixing screw member on the side connected with the pipe. By providing this removed portion, a mouth deformation allowing gap is defined between the sleeve and the fixing screw member for allowing the diameter enlarging deformation of the sleeve. Thus, it is possible to prevent the problem of the outer peripheral surface of the sleeve from coming into pressurized contact with the inner peripheral surface of the fixing screw member around the periphery of the first pressure bearing surface, even if the first pressure bearing surface is forcibly extended in the outward radial direction by the clamping load applied to the first pressure bearing surface from the pipe when a pipe fastening screw member is clamped. As a result, the axial load received by the sleeve from the pipe can be transmitted reliably to the main body side, and a reliable seal can be formed at both ends of the sleeve (the pressurized contact portion between the pipe and the sleeve, and the pressurized contact portion between the sleeve and the main body).

Description of a first embodiment will be made first with respect to the system constitution of an accumulator fuel injection device with reference to FIG. 4, and then with respect to a pipe coupling device to which the present invention is applied, with reference to FIGS. 1 through 3.

Figure 4:
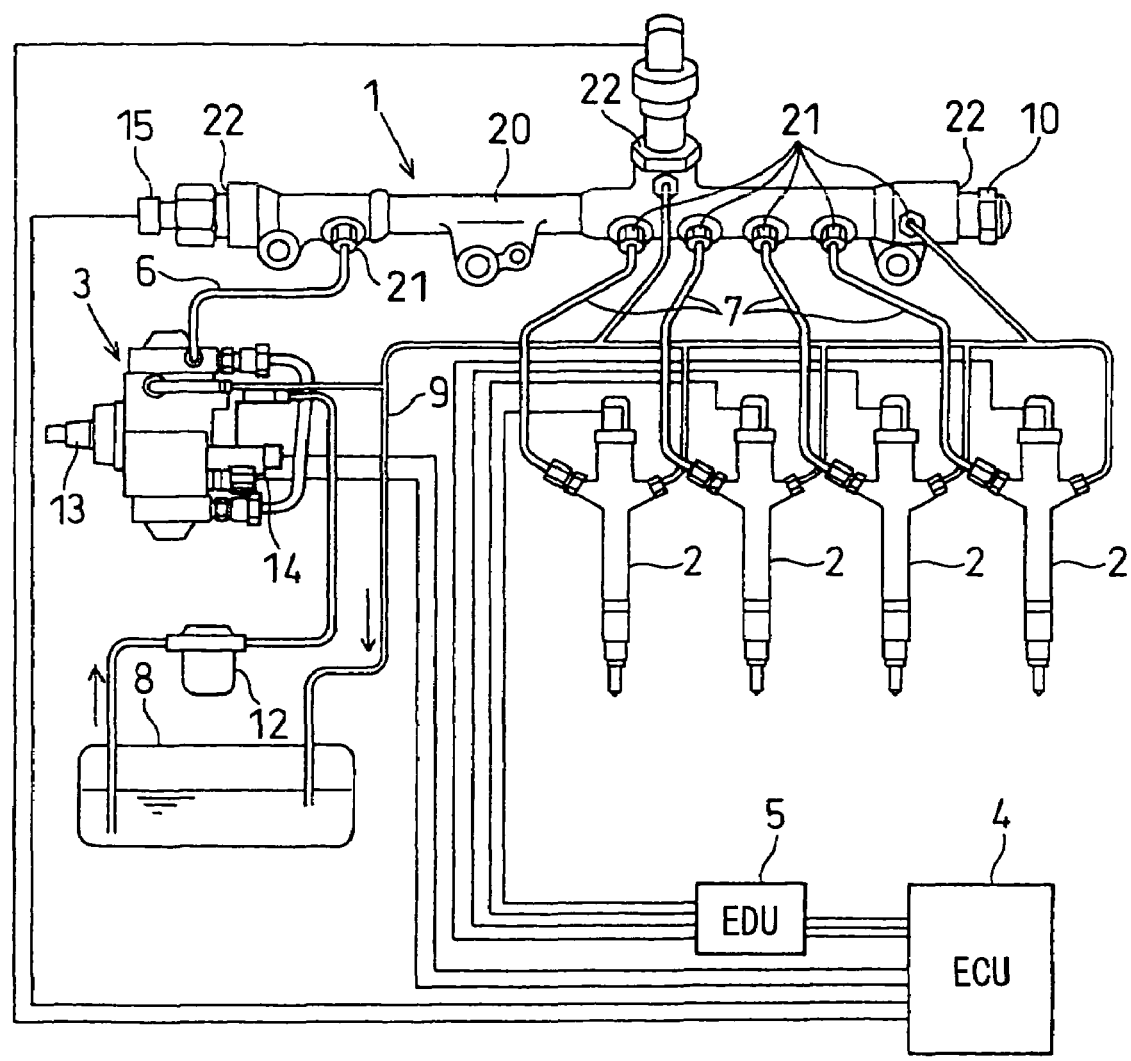
FIG. 4 is a system diagram of an accumulator fuel injection device according to a first embodiment.

An accumulator fuel injection device shown in FIG. 4 is a system for injecting fuel into cylinders of an engine (e.g. diesel engine, not shown in the drawings), and includes a common rail 1, injectors 2, a supply pump 3, an ECU (engine control unit) 4, an EDU (drive unit) 5, and so on.

The common rail 1 is an accumulator main body for accumulating high-pressure fuel to be supplied to the injectors 2 and is connected with the discharge port of the supply pump 3 for pumping high-pressure fuel through a high-pressure pump pipe 6 so that a common rail pressure corresponding to the fuel injection pressure is accumulated. The common rail 1 is also connected to a plurality of injector pipes 7 for supplying high-pressure fuel to the respective injectors 2. The connection structure between the common rail 1 and the high-pressure pump pipe 6 and the connection structure between the common rail 1 and the injector pipes 7 will be described later in detail.

A relief pipe 9 for returning fuel from the common rail 1 to a fuel tank 8 has a pressure limiter 10 attached thereto. The pressure limiter 10 is a pressure relief valve that is opened when fuel pressure within the common rail 1 exceeds a critical set pressure to hold the fuel pressure in the common rail 1 to a value not more than the critical set pressure.

The injectors 2 are mounted to respective cylinders of the engine for injecting and supplying fuel into the cylinders, and the injectors 2 are connected at the downstream end of a plurality of injector pipes 7 branching out from the common rail 1. Each of the injectors 2 is provided with a fuel injection nozzle for injecting and supplying high-pressure fuel accumulated in the common rail 1 into each cylinder, an electromagnetic valve for controlling the lift of a needle housed in the fuel injection nozzle, and so forth. Fuel leaked from the injectors 2 is also returned to the fuel tank 8 through the relief pipe 9.

The supply pump 3 is a high-pressure fuel pump for pumping high-pressure fuel to the common rail 1 and is provided with a feed pump for drawing fuel from the fuel tank 8 to the supply pump 3 through a filter 12 so that the fuel drawn by the feed pump can be compressed to high pressure and pumped to the common rail 1. The feed pump and the supply pump 3 are driven by a common cam shaft 13. The cam shaft 13 is rotated and driven by the engine.

The supply pump 3 has, in its fuel channel for guiding fuel to a pressure chamber in which fuel is pressurized to a high pressure, an SCV (suction control valve) 14 attached thereto for adjusting the degree of opening of the fuel channel. The SCV 14 is a valve that adjusts the amount of fuel drawn into the pressure chamber to change the discharge amount of fuel pumped to the common rail 1. The SCV 14 is controlled by a pump drive signal from the ECU 4, and the common rail pressure is adjusted by the adjustment of the discharge amount of fuel pumped to the common rail 1. This means that the ECU 4 is capable of controlling the common rail pressure to a value according to the running condition of the vehicle by controlling the SCV 14.

The ECU 4 is provided with a CPU, RAM, ROM and the like (not shown) and performs various types of arithmetic processing based on a program stored in the ROM and sensor signals (running condition of the-vehicle) read into the RAM. For a specific example of such processing, the ECU 4 is constructed to determine, each time fuel is injected, a target injection quantity, injection mode, and timing for opening/closing the valves of the injectors 2 for each of the cylinders based on the program stored in the ROM and sensor signals (running condition of the vehicle) read into the RAM.

The EDU 5 is a driving circuit that provides a valve-opening drive current to an electromagnetic valve of the injector 2 according to an injector valve-opening signal provided by the ECU 4, so that high-pressure fuel is injected and supplied to the cylinder. The fuel injection is stopped by stopping the valve-opening drive current.

The ECU 4 is connected with various sensors, including a pressure sensor 15 for detecting the common rail pressure, an accelerator sensor for detecting the accelerator opening, an engine speed sensor for detecting the engine speed, and a water temperature sensor for detecting the temperature of cooling water for the engine, as means for detecting the running condition and the like of the vehicle.

The common rail 1 is constituted by a common rail main body 20 with a pipe shape for storing ultra-high-pressure fuel in the inside thereof. The main body 20 is provided with pipe coupling devices 21 for connecting the high-pressure pump pipe 6, injector pipes 7, and the like. Further, the common rail main body 20 is provided with, in addition to the pipe coupling devices 21, a functional component connection portion 22 for attaching the pressure limiter 10, pressure sensor 15, and so on.

The common rail main body 20 is not limited to the one shown in FIG. 4, and may be formed of an inexpensive pipe material, and may be provided with a multiplicity of pipe coupling devices 21 in the axial direction of the pipe material, for the purpose of achieving cost reduction.

The pipe coupling device 21 will now be described with reference to FIG. 1. The pipe coupling device 21 has a fixing screw member 23 firmly joined to the common rail main body 20 (corresponding to the main body), and a sleeve 24 inserted into the inside thereof. The pipe coupling device 21 also has a pipe clamping member 25 or pipe fastening screw member 25 engaged with the fixing screw member 23 so that an intra-pipe passage 26 of a pipe (including high-pressure pump pipe 6, injector pipe 7 and the like: hereinafter to be referred to as "pipe 6, 7") is able to communicate with a main body passage hole 28 through a sleeve passage hole 27.

The common rail main body 20 has a plurality of main body passage holes 28 formed in the radial direction of the center hole (accumulator chamber for high-pressure fuel). The plurality of main body passage holes 28 are bored at appropriate intervals in the axial direction of the common rail main body 20. Each of the main body passage holes 28 is open at a flat part formed on the external surface of the common rail main body 20.

The fixing screw member 23 exhibits a substantially cylindrical shape and has an external thread 29 formed in the outer peripheral surface thereof. The fixing screw member 23 is joined to the flat part of the common rail main body 20 by resistance welding, brazing or the like at the position where the cylindrical center of this fixing screw member 23 substantially matches the center of the opening of the main body passage hole 28.

The sleeve 24 serves as a relay between the common rail main body 20 and the pipe 6, 7, and the sleeve passage hole 27 passes through the center of the sleeve 24 for communicating the main body passage hole 28 with the intra-pipe passage 26 of the pipe 6, 7. The sleeve 24 is provided with an orifice 31 midway within the sleeve passage hole 27 for decreasing pulsation generated within the pipe 6, 7. By providing the sleeve 24 with the orifice 31 in this manner, it is possible to eliminate the necessity of providing the common rail main body 20 with an orifice 31.

The pipe fastening screw member 25 is rotatable while being engaged with a step 33 at the rear of the first convergently tapered portion 32 of the pipe 6, 7, and has an internal thread 34 formed in the inner peripheral surface thereof to be engaged with the external thread 29.

Next, the seal structure defined at the pressurized contact portion between the pipe 6, 7 and the sleeve 24, and at the pressurized contact portion between the sleeve 24 and the common rail main body 20 will be explained. The first convergently tapered portion 32 exhibiting a substantially conical shape (or substantially spherical shape) is formed at the tip end of the pipe 6, 7. Further, at the upper mouth of the sleeve 24 that is brought into pressurized contact with the first convergently tapered portion 32, there is formed a first pressure bearing surface 35 that exhibits a substantially conical tapered shape so that the first convergently tapered portion 32 is inserted thereinto.

On the other hand, at the inserted tip end of the sleeve 24, there is formed a second convergently tapered portion 36 that exhibits a substantially conical shape (or a substantially spherical shape). Further, at the opening portion of the main body passage hole 28 that is brought into pressurized contact with the second convergently tapered portion 36, there is formed a second pressure bearing surface 37 that exhibits a substantially conical tapered shape so that the second convergently tapered portion 36 is inserted thereinto.

Thus, the first convergently tapered portion 32 is tightly pressed against the first pressure bearing surface 35 to form a first seal portion 38 (oil-tight surface) by screwing the pipe fastening screw member 25 onto the fixing screw member 23. Further, when the pipe fastening screw member 25 is screwed onto the fixing screw member 23, the second convergently tapered portion 36 is tightly pressed against the second pressure bearing surface 37 to form a second seal portion 39 (oil-tight surface) by the clamping load transmitted from the pipe 6, 7 to the sleeve 24.

(First Embodiment)

Since the pressurized contact portion between the first convergently tapered portion 32 of the pipe 6, 7 and the first pressure bearing surface 35 of the sleeve 24 is tapered, the first pressure bearing surface 35 is forcibly extended in the outward radial direction by the first convergently tapered portion 32 at the tip end of the pipe 6, 7 under the clamping load generated in the axial direction when the pipe fastening screw member 25 is clamped. Thus, the diameter of the sleeve 24 around the periphery of the first pressure bearing surface 35 is enlarged.

On the other hand, in order to prevent the sleeve 24 from tilting in the inside of the fixing screw member 23, a tilt preventing gap β (radial gap) is defined between the fixing screw member 23 and the sleeve 24 to be small in size, which is about 0.05 mm.

When the first pressure bearing surface 35 is forcibly extended in the circumferential direction, the gap between the periphery of the first pressure bearing surface 35 and the fixing screw member 23 is eliminated and the periphery of the first pressure bearing surface 35 comes into contact with the fixing screw member 23. When this happens, a problem is posed such that the clamping axial force to be transmitted to the lower side of the sleeve 24 (the side of the common rail main body 20) is offset by the contact between the periphery of the first pressure bearing surface 35 and the fixing screw member 23 and the required axial force will not act on the lower side of the sleeve 24.

To solve this problem, in the pipe coupling device of the present embodiment, the gap α defined between the fixing screw member 23 and the sleeve 24 is made large around the periphery of the first pressure bearing surface 35. In other words, the gap α between the fixing screw member 23 and the sleeve 24 is made large on the side where the pipe 6, 7 is connected.

Specifically, in the present embodiment, the outer diameter of the sleeve 24 on the side where the pipe 6, 7 is connected is made small so that the gap α between the fixing screw member 23 and the sleeve 24 is made large around the periphery of the first pressure bearing surface 35 while keeping the gap between the fixing screw member 23 and the sleeve 24 small on the side where the common rail main body 20 is connected. More specifically, in the present embodiment, the gap α defined between the fixing screw member 23 and the sleeve 24 is made large around the periphery of the first pressure bearing surface 35 by providing a step 41 for enlarging the gap α on the outer periphery of the sleeve 24 and decreasing the outer diameter of the sleeve 24 on the side connected with the pipe 6, 7.

It should be noted that the gap α defined between the fixing screw member 23 and the sleeve 24 around the periphery of the first pressure bearing surface 35 is set larger than the quantity at which the periphery of the first pressure bearing surface 35 is forcibly extended by a clamping axial force generated when the pipe fastening screw member 25 is screwed onto the fixing screw member 23 (quantity of diameter extension).

By thus enlarging the gap α between the fixing screw member 23 and the sleeve 24 around the periphery of the first pressure bearing surface 35, it is possible to avoid the problem of the sleeve 24 around the periphery of the first pressure bearing surface 35 from coming into contact with the fixing screw member 23. This is possible even when the first pressure bearing surface 35 is forcibly extended in the circumferential direction by the clamping axial force generated when the pipe fastening screw member 25 is clamped onto the fixing screw member 23. As the result, the clamping axial force received by the sleeve 24 through the pipe 6, 7 can be reliably transmitted to the second convergently tapered portion 36, and thus the second seal portion 39 can be reliably formed.

In other words, by enlarging the gap α between the fixing screw member 23 and the sleeve 24 around the periphery of the first pressure bearing surface 35, it is made possible to reliably form the first seal portion 38 and the second seal portion 39 and thus to reliably prevent the leakage of fuel.

In this embodiment, the sleeve 24 used for the pipe coupling device 21 of the common rail 1 is made of a steel material and configured such that the outside diameter is 8±2 mm, the inside diameter of the sleeve passage hole 27 is 3±2 mm, the length in the axial direction is 20±5 mm, and the taper angle of the first pressure bearing surface 35 is about 60±5 degrees. The clamping load applied to the first pressure bearing surface 35 from the clamping of the pipe fastening screw member 25 is in the range from 14 kN (lower limit of the clamping load) to 28 kN (upper limit of the clamping load).

Figure 2:
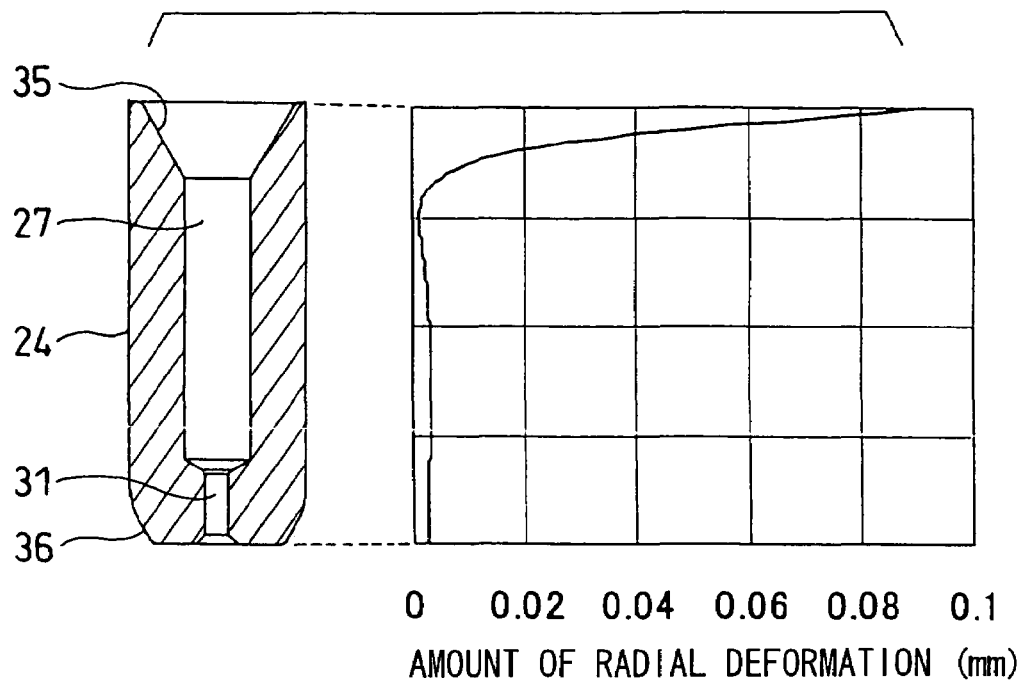
FIG. 2 is a graph of amounts of radial deformation in various parts in the axial direction of the sleeve according to a first embodiment.

As a specific example, FIG. 2 shows amounts of radial deformation of the sleeve 24, which are found when a clamping load of the upper limit 28 kN is applied to the first pressure bearing surface 35, using a sleeve 24 that is made of a steel material and configured such that the outside diameter is 8 mm, the inside diameter dimension of the sleeve passage hole 27 is 3 mm, the length in the axial direction is 20 mm, and the taper angle of the first pressure bearing surface 35 is 60 degrees. As seen from FIG. 2, when the upper limit clamping load of 28 kN is applied to the first pressure bearing surface 35, the end portion (mouth) on the first pressure bearing surface 35 side is deformed significantly and the amount of radial deformation is as large as 0.09 mm.

Figure 3:
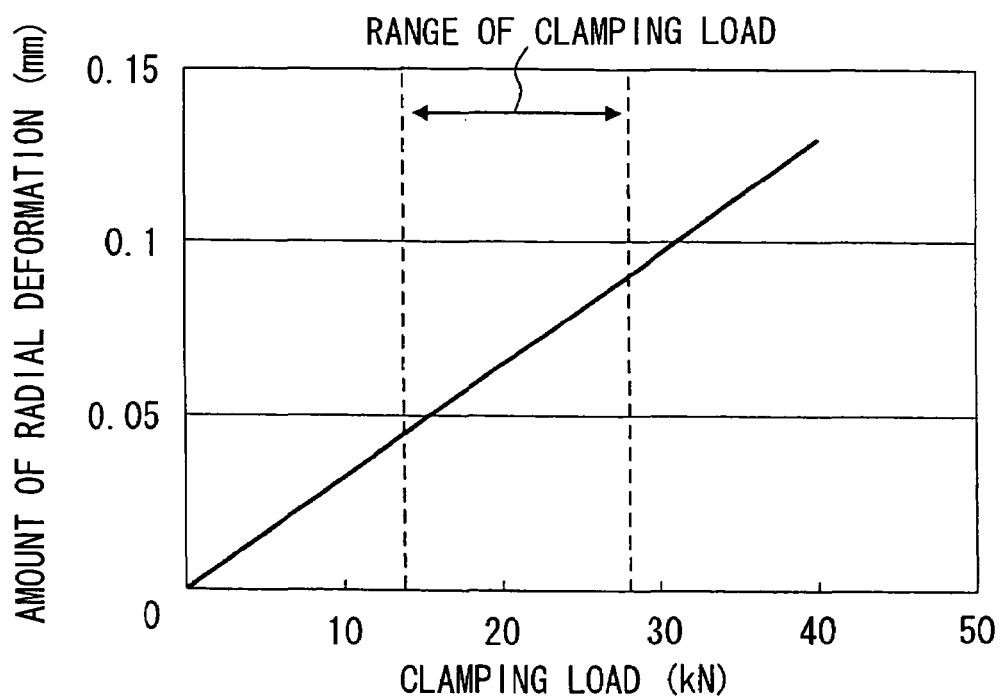
FIG. 3 is a graph of the relationship between the clamping loads and the amounts of deformation at the mouth of the sleeve according to a first embodiment.

Additionally, FIG. 3 shows the relationship between clamping loads applied to the first pressure bearing surface 35 and amounts of radial deformation of the end portion (mouth) on the first pressure bearing surface 35 side. As seen from FIG. 3, when the clamping load becomes 16 kN or more, the amount of radial deformation at the end portion (mouth) on the first pressure bearing surface 35 side becomes 0.05 mm or more.

Thus, when the clamping load applied to the first pressure bearing surface 35 becomes 16 kN or more, the amount of radial deformation at the end portion (mouth) on the first pressure bearing surface 35 side becomes 0.05 mm or more, and the gap between the periphery of the first pressure bearing surface 35 and the fixing screw member 23 is eliminated. As a result, the outer peripheral surface of the sleeve 24 comes into pressurized contact with the inner peripheral surface of the fixing screw member 23 around the periphery of the first pressure bearing surface 35.

When this happens, a problem is posed such that the axial load to be transmitted to the lower side (the common rail main body 20 side) of the sleeve 24 is offset by the pressurized contact between the periphery of the first pressure bearing surface 35 and the fixing screw member 23 and hence the necessary load will not be applied to the lower side of the sleeve 24.

To solve this problem, in the pipe coupling device 21 of this first embodiment, a mouth deformation allowing gap α is defined between the sleeve 24 and the fixing screw member 23 around the periphery of the first pressure bearing surface 35. The mouth deformation allowing gap α is larger than the tilt preventing gap β (0.05 mm) in the state before the diameter of the sleeve 24 on the first pressure bearing surface 35 side is enlarged by the clamping load applied to the first pressure bearing surface 35 (the state before assembly). This condition permits the amount of diameter enlarging deformation of the sleeve 24 around the periphery of the first pressure bearing surface 35.

The mouth deformation allowing gap α will now be described. The sleeve 24 of the first embodiment is made of a steel material and configured such that the taper angle of the first pressure bearing surface 35 is 60 degrees, the outside diameter dimension of the sleeve 24 is 8 mm, the inside diameter dimension of the sleeve passage hole 27 is 3 mm, and the length in the axial direction is 20 mm. Further, the clamping load applied to the first pressure bearing surface 35 is in the range of 14 kN to 28 kN. Accordingly, as shown in FIG. 3, the amount of radial deformation of the end portion (mouth) on the first pressure bearing surface 35 side is 0.045 to 0.09 mm.

Since the mouth deformation allowing gap α is supposed to allow the amount of radial deformation (0.045 to 0.09 mm) of the end portion (mouth) on the first pressure bearing surface 35 side, the size thereof should be at least 0.09 mm in the radial direction in the state before assembly and should be at least 0.1 mm in the radial direction for securing a margin.

Specifically, in the first embodiment, a step 41 is formed in the outer peripheral surface of the sleeve 24 to provide a removed portion A where the outside diameter of the sleeve 24 on the side connected with the pipe 6, 7 is reduced around the entire circumference, so that a mouth deformation allowing gap a of 0.1 mm or greater is defined between the sleeve 24 and the fixing screw member 23 around the periphery of the first pressure bearing surface 35.

It should be noted that the removed portion A may be formed by cutting the outside diameter of the sleeve 24 on the side connected with the pipe 6, 7. Likewise, the sleeve 24 may be preliminarily provided with the removed portion A by die cutting or the like.

(Effects of First Embodiment)

As described in the above, the removed portion A is formed around the entire outer circumference of the sleeve 24 on the side connected with the pipe 6, 7 to define the mouth deformation allowing gap α of at least 0.1 mm between the sleeve 24 and the fixing screw member 23 around the periphery of the first pressure bearing surface 35. Thereby, even if the diameter of the sleeve 24 around the periphery of the first pressure bearing surface 35 is enlarged in the radial direction by about 0.045 mm to about 0.09 mm by the clamping load of 14 kN to 28 kN applied to the first pressure bearing surface 35, the amount of the diameter enlargement of the sleeve 24 is allowed by the mouth deformation allowing gap α formed to be at least 0.1 mm. Therefore, the outer peripheral surface of the sleeve 24 is not brought into pressurized contact with the inner peripheral surface of the fixing screw member 23.

As a result, the axial clamping load received by the sleeve 24 through the pipe 6, 7 can be reliably transmitted to the second convergently tapered portion 36, and the second seal portion 39 can be reliably formed. In other words, by forming the mouth deformation allowing gap α for allowing the diameter enlargement of the sleeve 24 between the sleeve 24 and the fixing screw member 23 around the periphery of the first pressure bearing surface 35, it is possible to reliably form the first seal portion 38 and the second seal portion 39 and hence to form reliable seals.

[Second Embodiment]

A second embodiment will now be described with reference to FIG. 5. In the following embodiments, those members indicated by the same reference numerals as the members of the first embodiment have the same functions as the counterpart members of the first embodiment. In the first embodiment described above, the step 41 is provided in the outer peripheral surface of the sleeve 24 to decrease the outside diameter dimension of the sleeve 24 on the side connected with the pipe 6, 7, so that the mouth deformation allowing gap α is thereby formed.

Figure 5:
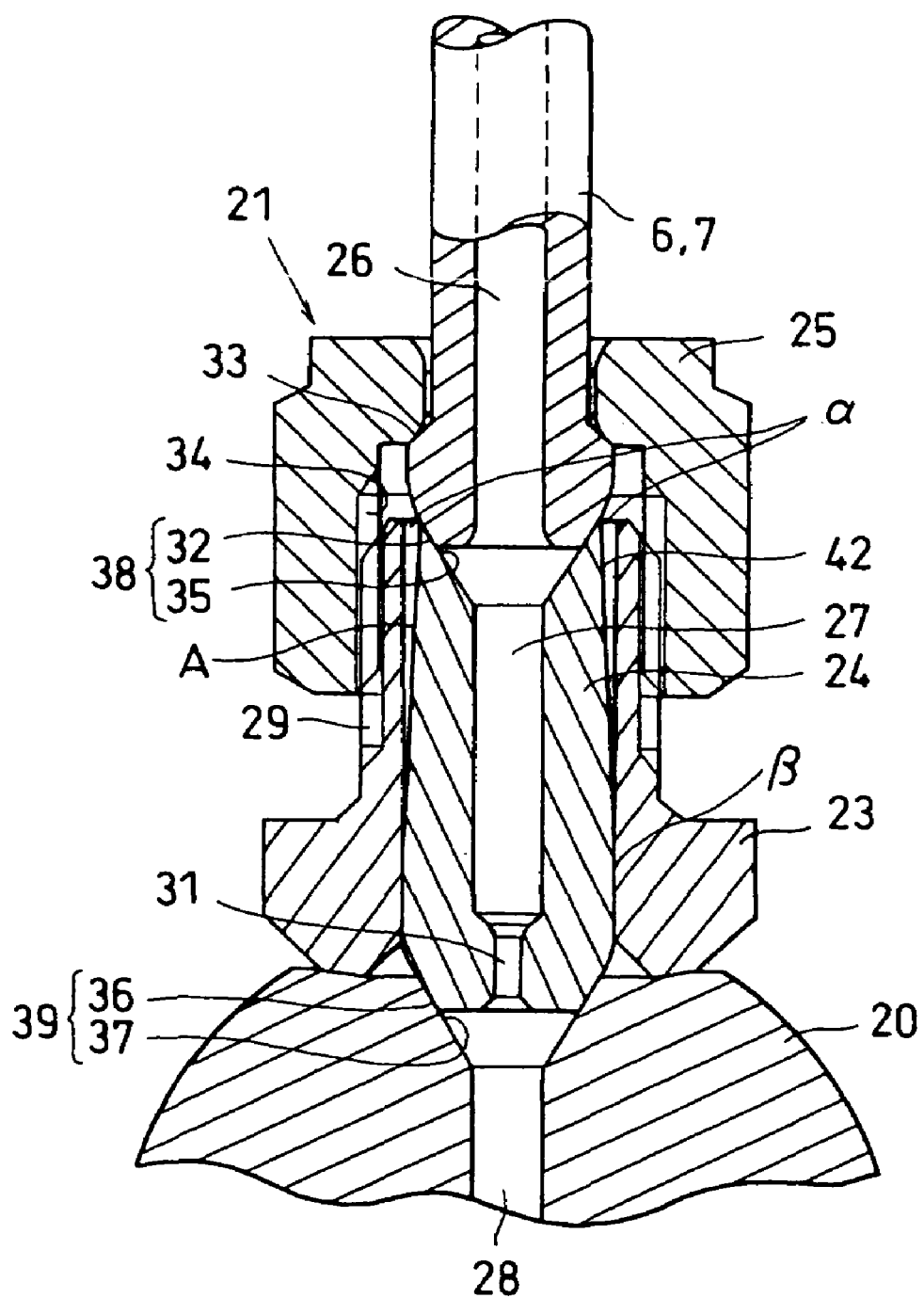
FIG. 5 is a cross-sectional view of a pipe coupling device according to a second embodiment.

In contrast, in the second embodiment as shown in FIG. 5, the outside diameter of the sleeve 24 on the side connected with the pipe 6, 7 is decreased by providing, on the entire outer peripheral surface of the sleeve 24 on the side connected with the pipe 6, 7, a tapered surface 42 (corresponding to the removed portion A) that is convergent towards the side connected with the pipe 6, 7. Also with such a constitution, the mouth deformation allowing gap α can be defined between the sleeve 24 and the fixing screw member 23 around the periphery of the first pressure bearing surface 35, and similar effects to the first embodiment can be obtained.

In this second embodiment, as in the first embodiment, the tapered surface 42 (removed portion A) may be formed by cutting the outside diameter of the sleeve 24 on the side connected with the pipe 6, 7, or the sleeve 24 may be preliminarily provided with the tapered surface 42 by die cutting or the like.

[Third Embodiment]

A third embodiment will now be described with reference to FIG. 6. In the first and second embodiments described above, examples have been shown in which the mouth deformation allowing gap α is formed by providing the removed portion A in which the outside diameter of the sleeve 24 on the side connected with the pipe 6, 7 is reduced around the entire circumference thereof. In contrast, in this third embodiment and a fourth embodiment to be described later, the mouth deformation allowing gap α is formed by providing a removed portion A in which the inside diameter of the fixing screw member 23 on the side connected with the pipe 6, 7 is enlarged around the entire circumference thereof.

Figure 6:
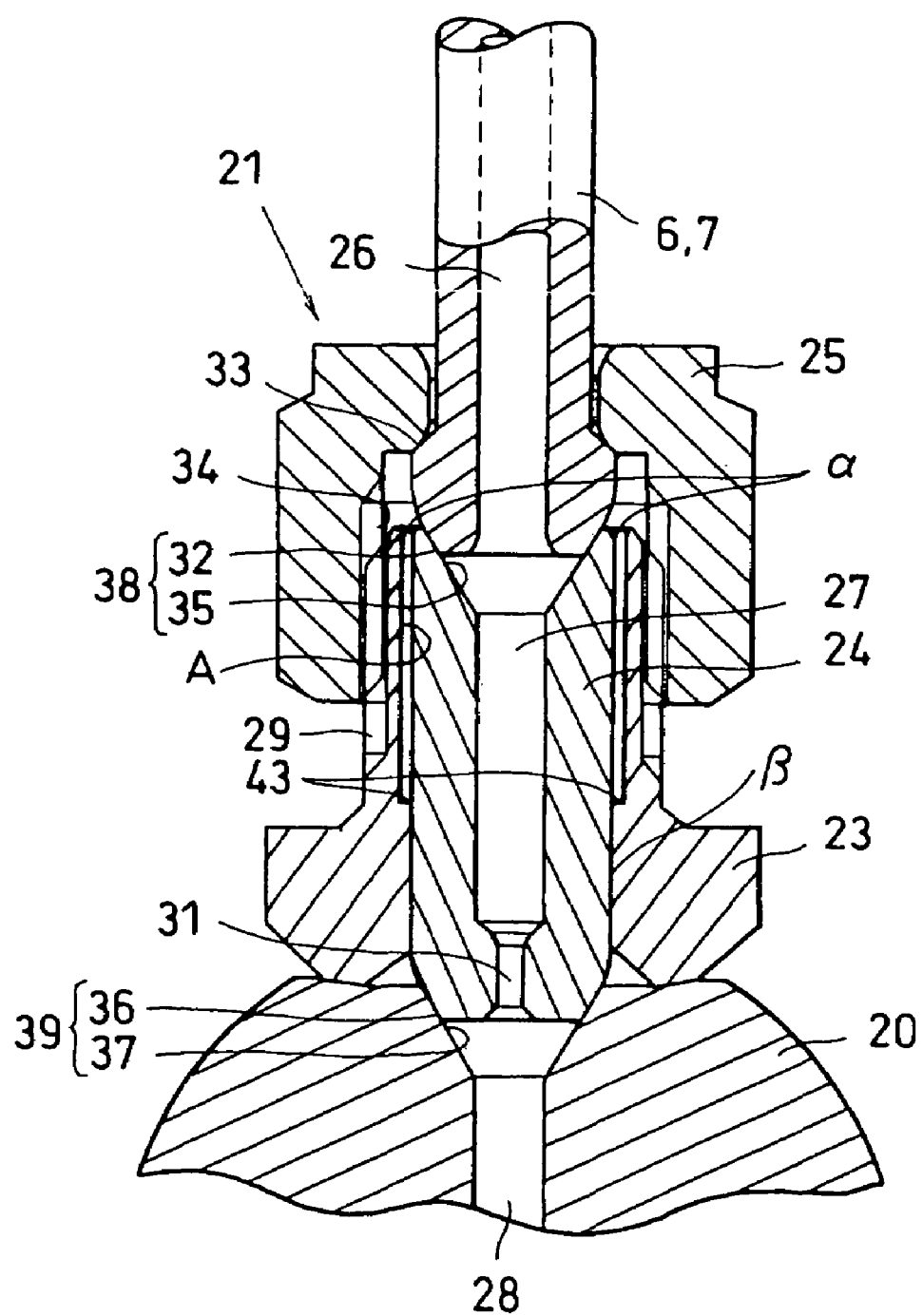
FIG. 6 is a cross-sectional view of a pipe coupling device according to a third embodiment.

Specifically, in the third embodiment, as shown in FIG. 6, a step 43 is provided in the inner peripheral surface of the fixing screw member 23 to provide the removed portion A in which the inside diameter of the fixing screw member 23 on the side connected with the pipe 6, 7 is enlarged around the entire circumference thereof, so that the mouth deformation allowing gap α is defined between the sleeve 24 and the fixing screw member 23 around the periphery of the first pressure bearing surface 35. Also with such constitution, similar effects to the first embodiment can be obtained.

It should be noted that, in the third embodiment, the removed portion A may be formed by cutting the inside diameter of the fixing screw member 23 on the side connected with the pipe 6, 7, or the fixing screw member 23 may be preliminarily provided with the removed portion A by die cutting or the like.

[Fourth Embodiment]

A fourth embodiment will now be described with reference to FIG. 7. In the third embodiment described above, an example has been shown in which the step 43 is provided in the inner peripheral surface of the fixing screw member 23 to provide the removed portion A in which the inside diameter of the fixing screw member 23 on the side connected with the pipe 6, 7 is enlarged around the entire circumference thereof.

Figure 7:
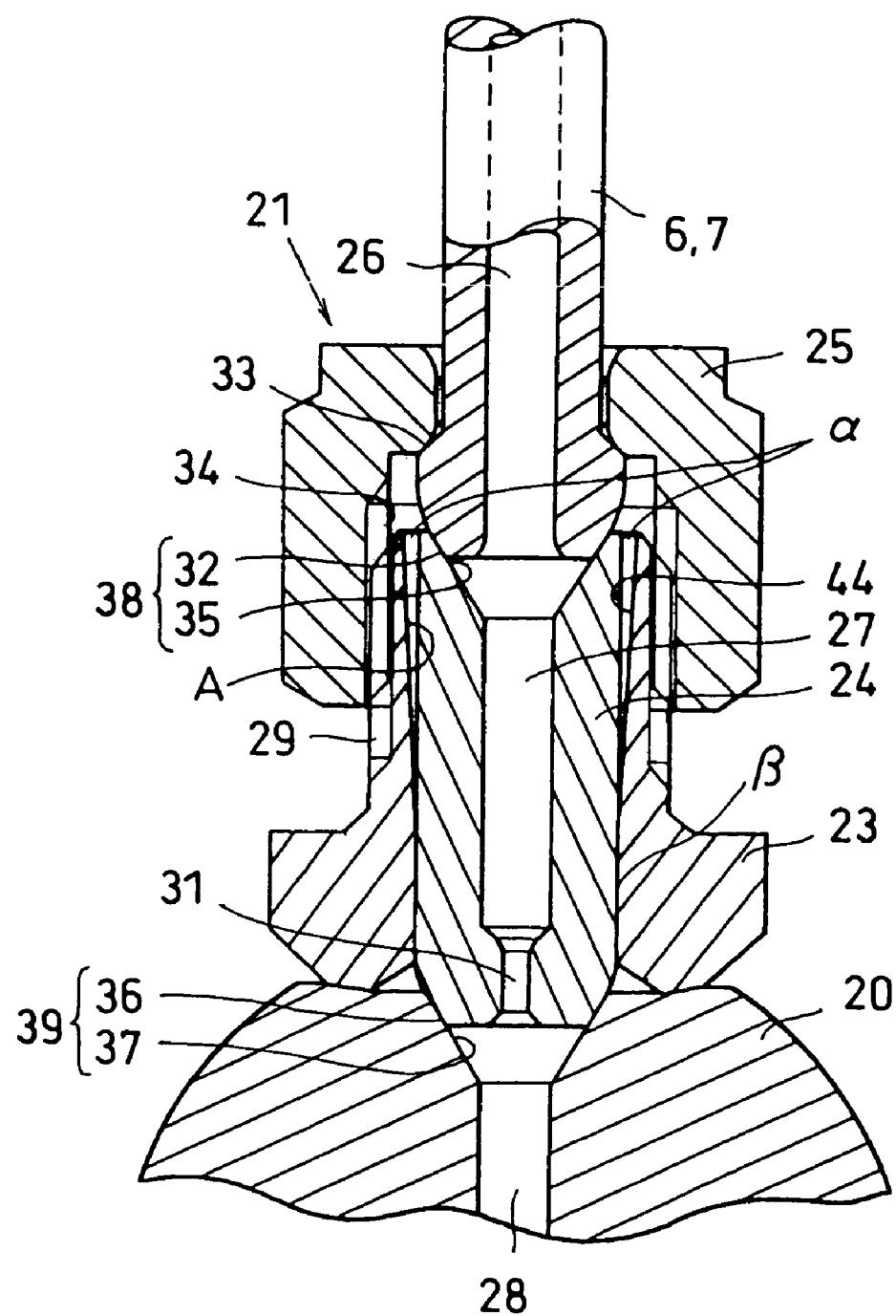
FIG. 7 is a cross-sectional view of a pipe coupling device according to a fourth embodiment.

In contrast, in this fourth embodiment as shown in FIG. 7, a tapered surface 44 (corresponding to the removed portion A) is provided in the entire inner peripheral surface of the fixing screw member 23 on the side connected with the pipe 6, 7 such that the tapered surface 44 enlarges towards the side connected with the pipe 6, 7, and the inside diameter of the fixing screw member 23 on the side connected with the pipe 6, 7 is thereby increased. Also with such constitution, the mouth deformation allowing gap α can be defined between the sleeve 24 and the fixing screw member 23 around the periphery of the first pressure bearing surface 35 and similar effects to the first embodiment can be obtained.

It should be noted that, in the fourth embodiment, the tapered surface 44 (removed portion A) may be formed by cutting the inside diameter of the fixing screw member 23 on the side connected with the pipe 6, 7, or the fixing screw member 23 may be preliminarily provided with the tapered surface 44 by die cutting or the like.

[Fifth Embodiment]

In the first to fourth embodiments described above, examples have been shown in which the mouth deformation allowing gap α is set to at least 0.1 mm by using a sleeve 24 typically used for the common rail 1 (a sleeve 24 that is made of a steel material and configured such that the outside diameter dimension is 8±2 mm, the inside diameter dimension of the sleeve passage hole 27 is 3±2 mm, the length in the axial direction is 20±5 mm, the taper angle of the first pressure bearing surface 35 is 60±5 degrees, and the clamping load is 14 kN to 28 kN).

However, in the case when any of the dimensions of the sleeve 24 differ from the values mentioned above, or the clamping load differs from the values mentioned above, one cannot know what is the minimum value to set the mouth deformation allowing gap α. Therefore, in this fifth embodiment, if the sleeve 24 is made of a steel material and the taper angle of the first pressure bearing surface 35 is 60 degrees, the mouth deformation allowing gap α is set to satisfy the following conditions.

Figure 8:
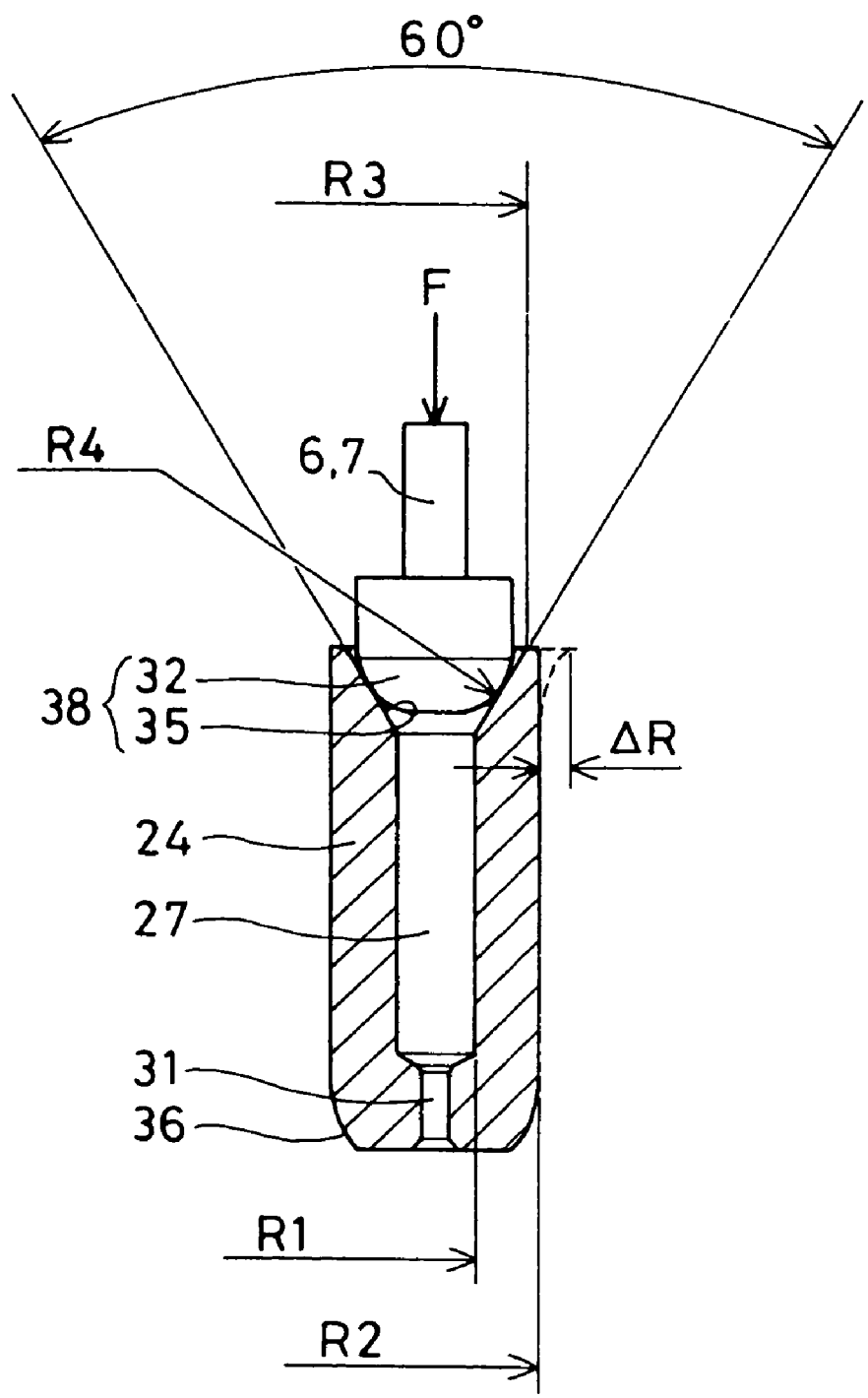
FIG. 8 is a cross-sectional view of a sleeve showing the symbols of variables used for calculation according to a fifth embodiment.
Figure 9:
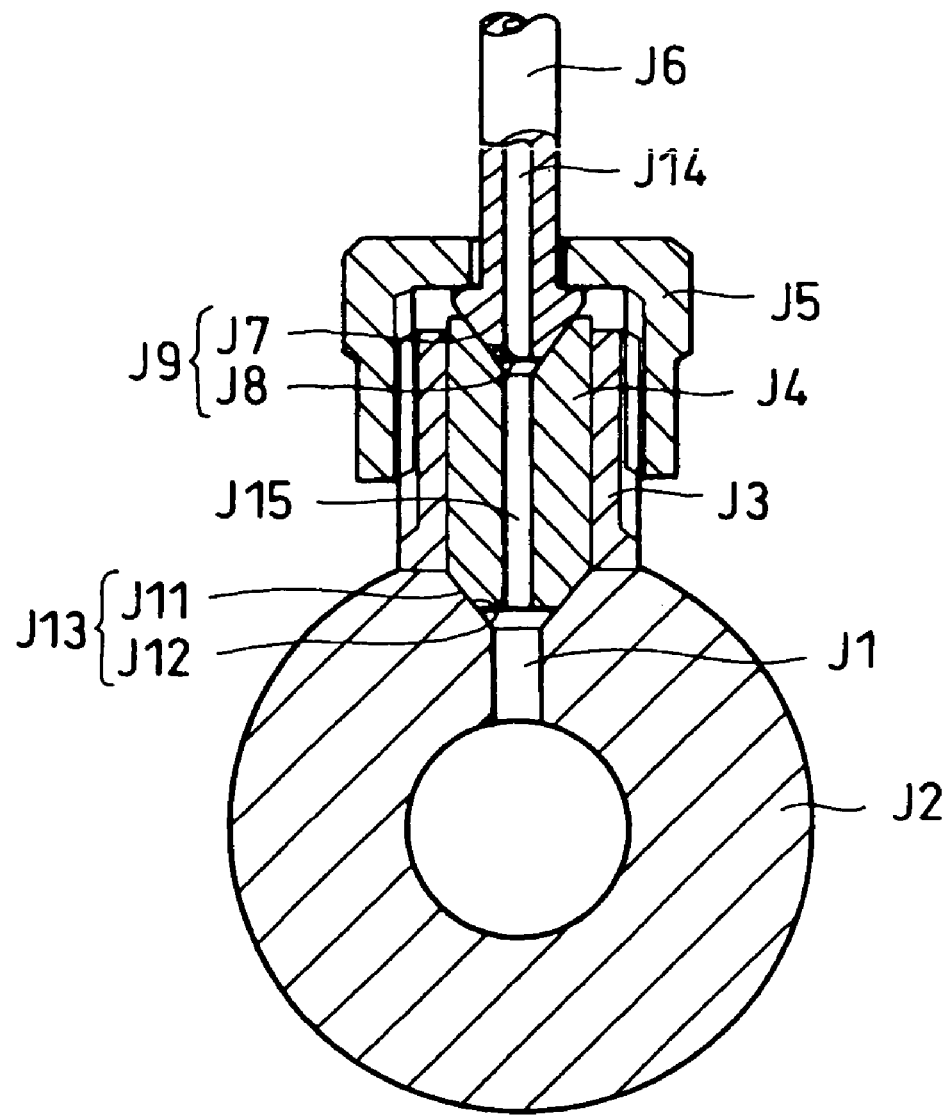
FIG. 9 is a cross-sectional view of a pipe coupling device according to an example of the prior art.

As shown in FIG. 8, the diameter difference ΔR (μm) due to the diameter enlarging deformation in the radial direction of the sleeve 24 around the periphery of the first pressure bearing surface 35 is obtained by the following formula where the inside radius of the sleeve 24 is denoted by R1 (mm), the outside radius of the sleeve 24 is denoted by R2 (mm), the radius at the mouth of the first pressure bearing surface 35 is denoted by R3 (mm), the pressing radius of the region of the first pressure bearing surface 35 against which the pipe 6, 7 is pressed is denoted by R4 (mm), and the clamping load of the pipe 6, 7 pressed against the first pressure bearing surface 35 is denoted by F (N).

$$\Delta R = 0.00326 \times R_1^{0.51} \times R_2^{-3.79} \times R_3^{-0.66} \times R_4^{4.26} \times F \quad \text{[Formula 3]}$$

Then, the mouth deformation allowing gap α is set to be larger than the diameter difference ΔR (μm) due to the diameter enlarging deformation (amount of the diameter enlarging deformation) thus obtained by the formula above (α>ΔR).

For example, showing a specific example of calculation, if R1=1.5, R2=4, R3=3.5, R4=4, and F=30000 N, then ΔR=100.9 (μm) and the mouth deformation allowing gap α is set to larger than ΔR=100.9 (μm) (α>100.9 μm).

By setting the mouth deformation allowing gap α in this manner, the amount of diameter enlargement of the sleeve 24 around the periphery of the first pressure bearing surface 35 is allowed by the mouth deformation allowing gap α even if the sleeve 24 around the periphery of the first pressure bearing surface 35 is forcibly extended by the clamping load generated when the pipe fastening screw member 25 is clamped onto the fixing screw member 23. Therefore, it is possible to avoid the problem that the outer peripheral surface of the sleeve 24 is brought into pressurized contact with the inner peripheral surface of the fixing screw member 23.

As a result, the axial clamping load received by the sleeve 24 can be reliably transmitted to the second convergently tapered portion 36 and the first seal portion 38, and the second seal portion 39 can be reliably formed such that effective sealing can be reliably formed.

[Modifications]

In the embodiments described above, examples have been shown in which the orifice 31 is provided to the sleeve 24, but the orifice 31 may be omitted. In the embodiments above, examples have been shown in which the present invention is applied to the pipe coupling device 21 for connecting the common rail main body 20 with the pipe 6, 7, but the present invention may be applied to other types of connection sites where a different type of main body (e.g. a component constituting a refrigeration cycle) is connected with a pipe (e.g. a refrigerant pipe). It will go without saying that fluid flowing through the pipe is not limited to liquid fuel and may be different types of liquid or gas.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pipe coupling device comprising:
   a main body defining a main body passage hole to permit communication between inside the main body passage hole and outside the main body passage hole;
   a fixing screw member joined to the main body and surrounding a periphery of the main body passage hole, the fixing screw member having external threads formed on its outer peripheral surface, and exhibiting a substantially hollow cylindrical hollow shape; and
   a sleeve inserted in the fixing screw member;
   a tilt-preventing gap and a mouth deformation allowing gap being defined between the sleeve and the fixing screw member, the tilt-preventing gap and the mouth deformation allowing gap being axially in series;
   a pipe fastening screw member that is coupled to a pipe so as to be rotatable with respect to a tip end thereof, the pipe fastening screw member having internal threads formed on an inner peripheral surface thereof engaged with the external threads of the fixing screw member, whereby:
   an intra-pipe passage defined in the pipe communicates with the main body passage hole through a sleeve passage hole formed at a center of the sleeve;
   a first convergently tapered portion formed at said tip end of the pipe presses against a first pressure bearing surface formed at a first end of the sleeve to form a first seal portion; and
   a second convergently tapered portion formed at a second end of the sleeve presses against a second pressure bearing surface formed at an opening portion of the main body passage hole to form a second seal portion, wherein the mouth deformation allowing gap is defined radially outside of and axially overlapping with the first pressure bearing surface and has a radial dimension that is larger than a radial dimension of the tilt-preventing gap such that a clamping load applied to the first pressure bearing surface of the sleeve substantially eliminates the tilt-preventing gap to prevent tilting of the sleeve within the fixing screw member and allows the first end of the sleeve to freely radially deform.

2. The pipe coupling device according to claim 1, wherein the mouth deformation allowing gap is defined by reducing an outside diameter of the first end of the sleeve relative to an outside diameter of the second end of the sleeve.

3. The pipe coupling device according to claim 2, wherein the reduced outer diameter of the sleeve is provided by tapering the outer surface of the sleeve adjacent the first end.

4. The pipe coupling device according to claim 2, wherein the reduced outer diameter is defined by a step in an outer surface of the sleeve.

5. The pipe coupling device according to claim 1, wherein the mouth deformation allowing gap is defined by enlarging an inside diameter of the fixing screw member adjacent to the first end of the sleeve relative to an inside diameter of the fixing screw member adjacent to the second end of the sleeve.

6. The pipe coupling device according to claim 5, wherein the enlarged inside diameter of the fixing screw member is provided by an inclined inner surface of the fixing screw member.

7. The pipe coupling device according to claim 5, wherein the enlarged inside diameter is provided by a step in an inner surface of the fixing screw member.

8. The pipe coupling device according to claim 1, wherein when the sleeve is made of a steel material, an inside radius of the sleeve is denoted by Ri (mm), an outside radius of the sleeve is denoted by R2 (mm), a radius at the mouth of the first pressure bearing surface is denoted by R3 (mm), a pressing radius of a region of the first pressure bearing surface where the pipe is pressed against it is denoted by R4 (mm), and a clamping load of the pipe pressed against the first pressure bearing surface is denoted by F (N), the mouth deformation allowing gap is larger than a diameter difference due to the diameter enlarging deformation AR (μm) obtained by the following formula:

$$\Delta R = 0.00326 \times R_1^{0.51} \times R_2^{-3.79} \times R_3^{-0.66} \times R_4^{4.26} \times F.$$

9. The pipe coupling device according to claim 1, wherein the main body is a common rail main body for storing high-pressure fuel in an accumulator fuel injection device.

10. The pipe coupling device according to claim 9, wherein
the mouth deformation allowing gap is formed to be at least 0.1 mm in a radial direction.

11. A pipe coupling device comprising:
a main body defining a main body passage hole passing between an inside of the body and an outside of the body;
a fixing screw member joined to the main body and surrounding a periphery of the main body passage hole, having an external thread formed on an outer peripheral surface thereof, and exhibiting a substantially hollow cylindrical shape;
a sleeve inserted inside of the fixing screw member; and
a pipe fastening screw member that is coupled to a pipe so as to be rotatable with respect to a tip end thereof, the pipe fastening screw member having internal threads formed on an inner peripheral surface thereof engaged with the external threads of the fixing screw member, whereby:
an intra-pipe passage of the pipe communicates with the main body passage hole through a sleeve passage hole defined at a center of the sleeve;
a first convergently tapered portion formed at said tip end of the pipe presses against a first pressure bearing surface formed at a first end of the sleeve to form a first seal portion; and
a second convergently tapered portion formed at a second end of the sleeve presses against a second pressure bearing surface formed at an opening portion of the main body passage hole to form a second seal portion, wherein
a mouth deformation allowing gap is defined between an outer diameter surface of the sleeve and an inner diameter surface of the fixing member, the mouth deformation allowing gap being disposed radially outside of and axially overlapping with the first pressure bearing surface.

12. The pipe coupling device according to claim 11, wherein
said mouth deformation allowing gap is formed in an outer diameter of the sleeve on a portion adjacent to the pipe.

13. The pipe coupling device according to claim 11, wherein
the main body is a common rail main body for storing high-pressure fuel in an accumulator fuel injection device.

14. A pipe coupling device comprising:
a main body defining a main body passage hole passing between an inside of the body and an outside of the body;
a fixing screw member joined to the main body and surrounding a periphery of the main body passage hole, having an external thread formed on an outer peripheral surface thereof, and exhibiting a substantially cylindrical shape;
a sleeve inserted inside of the fixing screw member; and
a pipe fastening screw member that is coupled to a pipe so as to be rotatable with respect to a tip end thereof, the pipe fastening screw member having internal threads formed on an inner peripheral surface thereof engaged with the external threads of the fixing screw member, whereby:
an intra-pipe passage of the pipe communicates with the main body passage hole through a sleeve passage hole defined at a center of the sleeve;
a first convergently tapered portion formed at said tip end of the pipe presses against a first pressure bearing surface formed at a first end of the sleeve to form a first seal portion; and
a second convergently tapered portion formed at a second end of the sleeve presses against a second pressure bearing surface formed at an opening portion of the main body passage hole to form a second seal portion, wherein
a mouth deformation allowing gap is defined between an outer diameter surface of the sleeve and an inner diameter surface of the fixing screw member, and
said mouth deformation allowing gap is defined by a taper in the outer diameter surface of the sleeve on a portion adjacent to the pipe.

15. A pipe coupling device comprising:
a main body defining a main body passage hole passing between an inside of the body and an outside of the body;
a fixing screw member joined to the main body and surrounding a periphery of the main body passage hole, having an external thread formed on an outer peripheral surface thereof, and exhibiting a substantially cylindrical shape;
a sleeve inserted inside of the fixing screw member; and
a pipe fastening screw member that is coupled to a pipe so as to be rotatable with respect to a tip end thereof, the pipe fastening screw member having internal threads formed on an inner peripheral surface thereof engaged with the external threads of the fixing screw member, whereby:
an intra-pipe passage of the pipe communicates with the main body passage hole through a sleeve passage hole defined at a center of the sleeve;
a first convergently tapered portion formed at said tip end of the pipe presses against a first pressure bearing surface formed at a first end of the sleeve to form a first seal portion; and
a second convergently tapered portion formed at a second end of the sleeve presses against a second pressure bearing surface formed at an opening portion of the main body passage hole to form a second seal portion, wherein
a mouth deformation allowing gap is defined between an outer diameter surface of the sleeve and an inner diameter surface of the fixing screw member, and said mouth deformation allowing gap is in the inner diameter surface of the fixing screw member adjacent to the pipe.

16. The pipe coupling device according to claim 15, wherein said mouth deformation allowing gap is formed by a step in the inner diameter surface of the fixing screw member.

17. A pipe coupling device comprising:
a main body defining a main body passage hole passing between an inside of the body and an outside of the body;
a fixing screw member joined to the main body and surrounding a periphery of the main body passage hole, having an external thread formed on an outer peripheral surface thereof, and exhibiting a substantially cylindrical shape;
a sleeve inserted inside of the fixing screw member; and
a pipe fastening screw member that is coupled to a pipe so as to be rotatable with respect to a tip end thereof, the pipe fastening screw member having internal threads formed on an inner peripheral surface thereof engaged with the external threads of the fixing screw member, whereby:
an intra-pipe passage of the pipe communicates with the main body passage hole through a sleeve passage hole defined at a center of the sleeve;
a first convergently tapered portion formed at said tip end of the pipe presses against a first pressure bearing surface formed at a first end of the sleeve to form a first seal portion; and
a second convergently tapered portion formed at a second end of the sleeve presses against a second pressure bearing surface formed at an opening portion of the main body passage hole to form a second seal portion, wherein
a mouth deformation allowing gap is defined between an outer diameter surface of the sleeve and an inner diameter surface of the fixing screw member, and said mouth deformation allowing gap is defined by a taper in the inner diameter surface of the fixing screw member on a portion adjacent to the pipe.

18. A pipe coupling device comprising:
a main body defining a main body passage hole to permit communication between inside the main body passage hole and outside the main body passage hole;
a fixing screw member joined to the main body and surrounding a periphery of the main body passage hole, the fixing screw member having external threads formed on its outer peripheral surface and exhibiting a substantially cylindrical shape;
a sleeve inserted inside of the fixing screw member, a tilt-preventing gap being defined between the sleeve and the fixing screw member; and
a pipe fastening screw member having internal threads formed on an internal peripheral surface thereof engaged with the external threads of the fixing screw member and rotatable while engaging a pipe, whereby:
an intra-pipe passage defined in the pipe communicates with the main body passage hole through a sleeve passage hole formed at a center of the sleeve;
a first convergently tapered portion formed at a tip end of the pipe presses against a first pressure bearing surface formed at a first end of the sleeve to form a first seal portion; and
a second convergently tapered portion formed at a second end of the sleeve presses against a second pressure bearing surface formed at an opening portion of the main body passage hole to form a second seal portion, wherein
a mouth deformation allowing gap is defined between the sleeve and the fixing screw member around the periphery of the first pressure bearing surface and larger than the tilt-preventing gap, for allowing diameter enlarging deformation of the sleeve due to a clamping load applied to the first pressure bearing surface from the pipe, and wherein
when the sleeve is made of a steel material, an inside radius of the sleeve is denoted by Ri (mm), an outside radius of the sleeve is denoted by R2 (mm), a radius at the mouth of the first pressure bearing surface is denoted by R3 (mm), a pressing radius of a region of the first pressure bearing surface where the pipe is pressed against it is denoted by R4 (mm), and a clamping load of the pipe pressed against the first pressure bearing surface is denoted by F (N), the mouth deformation allowing gap is larger than a diameter difference due to the diameter enlarging deformation $\Delta R$ ($\mu$m) obtained by the following formula:

$$\Delta R = 0.00326 \times R_1^{0.51} \times R_2^{-3.79} \times R_3^{-0.66} \times R_4^{4.26} \times F.$$

* * * * *